United States Patent

[11] 3,609,111

| [72] | Inventor | Ju Kumanotani |
| | | Chofu-shi, Japan |
| [21] | Appl. No. | 680,988 |
| [22] | Filed | Nov. 6, 1967 |
| [45] | Patented | Sept. 28, 1971 |
| [73] | Assignee | Kansai Paint Company Limited |
| | | Kanzaki, Amagasaki-shi, Hyogo-ken, Japan |
| [32] | Priority | Nov. 7, 1966 |
| [33] | | Japan |
| [31] | | 41/73163 |

[54] COMPOSITION FOR ELECTROPHORETIC DEPOSITION
10 Claims, No Drawings

[52] U.S. Cl................................................ 260/29.7,
204/181, 260/78.4
[51] Int. Cl............................................... C09d 3/00
[50] Field of Search............................... 260/29.7,
78.4, 885, 18 O; 204/181

[56] References Cited
UNITED STATES PATENTS

| 2,933,468 | 4/1960 | Aldridge et al. | 260/29.7 AT |
| 3,055,855 | 9/1962 | Anderson et al. | 260/29.7 H |
| 3,321,430 | 5/1967 | Ott et al. | 260/29.7 H |
| 3,365,411 | 1/1968 | Mertzweiller et al. | 260/29.7 W |
| 3,366,563 | 1/1968 | Hart et al. | 260/29.7 H |
| 2,428,586 | 2/1969 | Coats | 260/29.7 H |
| 3,428,589 | 2/1969 | Coats | 260/29.7 H |
| 3,431,227 | 3/1969 | Kastning et al. | 260/29.7 H |
| 2,634,256 | 4/1953 | Sparks | 260/78.4 |
| 3,230,162 | 1/1966 | Gilchrist | 204/181 |
| 3,488,332 | 1/1970 | Hiraoka et al. | 260/83.7 |

FOREIGN PATENTS

| 800,161 | 8/1958 | Great Britain | 260/29.7 AT |
| 40-7,051 | 4/1965 | Japan | 260/29.7 |

*Primary Examiner*—Jay H. Woo
*Attorney*—Stephens, Heuttig & O'Connell

ABSTRACT: In a coating composition adapted for electrophoretic deposition containing an aqueous medium and a resinous binder dispersed therein, improvement comprising the resinous binder being a modified butadiene polymer prepared by reacting a butadiene polymer of a number average molecular weight of 200 to 5,000 with an $\alpha,\beta$-ethylenically unsaturated monocarboxylic acid and neutralizing the resultant adduct with a base to turn it water-dispersible.

COMPOSITION FOR ELECTROPHORETIC DEPOSITION

This invention relates to new and useful electrophoretic coating compositions, and more particularly to water-thinnable concentrated compositions and bath compositions adapted for electrophoretic deposition, the binder of which is a specific modified butadiene polymer.

The electrophoretic deposition of resinous coatings from aqueous medium is well known in the art, and for such purposes many aqueous paints containing various resin binders have been proposed. However, the known paints were not satisfactory for numerous properties required in combination for such purposes, including, for example, good stability, high-throwing power to give even coatings onto the whole surface of the object to be coated, low selectivity of electrodeposition to give uniform coatings even in repeated use, and capacity to give coated film having excellent properties.

An object of the invention is to provide a new and useful electrophoretic coating composition which provides the properties required for electrodeposition.

Another object of the invention is to provide an electrophoretic coating composition which is stable and thinnable with water to the desired extent to give a stable bath composition.

A further object of the invention is to provide a coating composition adapted for electrophoretic deposition, which displays high-throwing power to give uniform coatings onto the whole surface of the objects to be coated.

Still a further object of the invention is to provide a coating composition which displays low selectivity of electrodeposition to give uniform coatings even in repeated use.

Still another object of the invention is to provide a coating composition from which a coated film having excellent resistant properties, such as good resistance to water, chemicals and corrosion as well as excellent mechanical strength is obtainable by electrophoretic deposition.

These and other objects of the invention will be apparent from the following description.

The above objects of the invention can be accomplished with a coating composition adapted for electrophoretic deposition, which comprises an aqueous dispersion of modified butadiene polymer binder prepared by reacting a butadiene polymer with $\alpha,\beta$-ethylenically unsaturated monocarboxylic acid and neutralizing the resultant adduct with a base to turn it water dispersible.

This invention is based on the discovery that electrophoretic coating composition containing as a binder the specific modified butadiene polymers as above fully satisfy almost all properties required for electrophoretic deposition.

The term "water-dispersible" is intended to include materials which dissolve or which can be emulsified in water, and the term "aqueous dispersion" is intended to include aqueous solution or aqueous emulsion.

The butadiene polymers used in the invention include homopolymers of butadiene, copolymers of butadiene and derivatives thereof. The homopolymers of butadiene are 1,2-addition butadiene homopolymer, 1,4-addition butadiene homopolymer and 1,2- and 1,4-random addition butadiene homopolymer. The copolymers of butadiene are those comprising at least 70 weight percent of butadiene and at most 30 weight percent of other monomer, such as isoprene, chloroprene, styrene, methyl methacrylate, acrylo-nitrile, etc. The derivatives of butadiene homopolymers or copolymers are polybutadiene dicarboxylic acid, polybutadiene glycol, partially oxidized polybutadiene, partially hydrogenated polybutadiene or partially halogenated polybutadiene. Of these butadiene polymers butadiene homopolymers are most desirable, giving a particularly excellent coated film by electrodeposition. The molecular weight of the butadiene polymers varies over a wide range, but it is desirable to use those having a number average molecular weight ranging from 200 to 5,000, particularly 800 to 4,000. The smaller the distribution of molecular weight the better result is obtainable in electrodeposition, giving uniform coatings even in repeated use.

These butadiene polymers are known in the art and prepared by conventional methods, such as radical polymerization and ion polymerization. The most desirable polymerization method is living polymerization as the polymer obtained by such method has a narrow range of distribution of molecular weight.

The living polymerization method of butadiene has been known in the art and disclosed in Japanese Pat. Publications No. 7051/1965 and 17485/1967.

For instance, the living polymerization of butadiene is usually carried out by adding butadiene or a mixture of butadiene and a diluent to a mixture of Lewis base, such as tetrahydrofuran, and alkali metal, such as lithium or sodium, polymerizing the butadiene to the desired molecular weight and then adding a terminating agent to terminate the polymerization reaction. Naphthalene, 1,2-diphenyl benzene and the like aromatic hydrocarbon activators may be added to the polymerization system, if desired. When water, aliphatic alcohol, Lewis acid and the like is used as a terminating agent 1,2-addition butadiene homopolymer is produced. When carbon dioxide is used as such agent 1,2-addition butadiene homopolymer dicarboxylic acid having carboxyl group at both ends of the polymer main chain is obtainable, and when alkylene oxide is used 1,2-addition butadiene homopolymer glycol having hydroxyl group at both ends of the polymer main chain is obtainable. In case of producing copolymers of butadiene, a mixture of butadiene and one or more of other monomers is used as the starting monomer, and depending on the kinds of the terminating agent as above butadiene copolymer, butadiene copolymer dicarboxylic acid or butadiene copolymer glycol can be obtained.

In the invention the butadiene polymers are reacted with $\alpha,\beta$-ethylenically unsaturated monocarboxylic acids to produce the adducts of the both compounds. Any $\alpha,\beta$-ethylenically unsaturated monocarboxylic acids may be used. The typical examples are acrylic acid, methacrylic acid, crotonic acid, 2-chloroacrylic acid, 2-bromoacrylic acid, etc. The proportion of the acid to the butadiene polymers varies over a wide range, but it is desirable to use the acid in the range of 5 to 50 weight parts, particularly 7 to 30 weight parts, based on 100 weight parts of the butadiene polymers.

Said addition reaction may be carried out either in molten state or in the presence of organic solvent. The preferred reaction temperature is usually in the range of 60° to 180° C., most desirable being 80° to 110° C. To prevent the undesired side reaction it is desirable to carry out the reaction in inert gas atmosphere, e.g., nitrogen gas and the like. The organic solvents used as required are those having the ability to dissolve the starting butadiene polymers and acids and the reaction product, and various kinds of solvents may be used, but those of hydrophilic property are preferred. The representatives are alkoxy alkanols, such as methoxy ethanol, ethoxy ethanol, butoxy ethanol, etc.; glycol ethers, such as diethyleneglycol methylether, diethyleneglycol ethylether, 1-butoxyethoxy-2-propanol, etc.; alcohols such as butyl alcohol, tetrahydrofurfryl-alcohol, tetrahydropyran-2-methanol, etc.; glycols such as ethylene glycol, diethylene glycol, propylene glycol, hexylene glycol, etc,; and ethers such as tetrahydrofuran, dioxane, etc. The solvents are preferably used in 30 100 weight parts, based on 100 weight parts of butadiene polymers.

To accelerate the reaction catalysts may be added to the reaction system usually in 0.5 to 5.0 weight parts, preferably 1.0 to 3.0 weight parts, based on 100 weight parts of $\alpha,\beta$-ethylenically unsaturated monocarboxylic acids. As the catalyst there may be used radical initiators such as benzoyl peroxide, tertiary butyl peroxide, cumene hydroperoxide, azobisisobutyronitrile, etc. and Redox catalyst such as benzoyl peroxide-dimethyl aniline etc. Further to prevent the undesired gellation there may be added mercaptans and the like chain transfer agent or benzoquinone and the like polymerization inhibitors.

Thus the addition products of butadiene polymers and $\alpha,\beta$-ethylenically unsaturated monocarboxylic acids are obtained in the form of molten state or organic solvent solution.

The resultant adduct is then neutralized with a base to produce the desired water-dispersible salt thereof. Prior to the neutralizing reaction, it is not necessary to remove organic solvent from the adduct solution when such solvent is hydrophilic, unless the presence of such solvent adversely affects the properties for electrophoretic deposition of the final composition. The neutralizing reaction is usually carried out at a room temperature or thereabout. As the base there may be used sodium hydroxide, potassium hydroxide, ammonium hydroxide, ammonium carbonate, sodium carbonate, potassium carbonate, and the like inorganic bases, and ethanolamine, diethanolamine, triethanolamine, dimethylaminoethanol, diethylaminoethanol, trimethylamine, triethylamine, N-ethylmorpholine, 2-amino-2-methyl-1-propanol, 2-amino-2-methyl-1,3-propanediol, tris(hydroxymethyl)aminomethane and the like aliphatic amines. Said base may be used in a form of aqueous solution, thus aqueous dispersion of the resultant base is obtainable. Said base is used at least necessary amount to disperse the addition product into water. Preferably, 0.5 to 1.2 equivalent amount of base is used calculated on the carboxyl group of the adduct.

The aqueous dispersion thus obtained contains the modified butadiene polymers, i.e., salts of addition products of butadiene polymers and $\alpha,\beta$-ethylenically unsaturated monocarboxylic acids, in a concentration of 30 to 60 weight percent, and has a pH value of 7.0 to 8.5. The aqueous dispersion is stable and may be used for electrodeposition as it is or after pigmented by pigments. The pigments used are, for example, talc, calcium carbonate, iron oxide, titanium dioxide, lead chromate, strontium chromate, carbon black, etc. The pigments to binder ratio by weight is desirably in the range of from 1:1 to 1:5. There may be further added pigment dispersing agent, drying agent and the like, where necessary. The aqueous dispersion or paint may be diluted with water to any desired extent to obtain a bath composition for electrodeposition. The solid content in the bath composition is usually in the range of 5 to 30 weight percent, preferably 10 to 20 weight percent.

The compositions of the invention are used in a conventional manner by passing an electric current through the dispersion to deposit the film upon an immersed object, which is anode of the electrical system.

For a fuller understanding of the invention examples are given below, in which all parts and percentage represent weight parts unless otherwise specified.

EXAMPLE 1

In a reactor equipped with a thermometer, agitator, dropping funnel, reflux condenser and gas injector were placed 100 parts of 1,2-addition butadiene homopolymer of number average molecular weight of 1,000, prepared by the living polymerization method, and 30 parts of butoxyethanol, and heated up to 100° C. with thorough stirring, nitrogen gas being introduced. When the temperature of the content became constant a mixture of 15 parts of acrylic acid, 15 parts of butoxyethanol and 0.3 part of $\alpha,\alpha'$-azobisisobutyronitrile was added dropwise thereto through dropping funnel in 2 hours. In said operation the content was kept at 100°C. After being cooled, to 138 parts of the resultant mixture containing 100 parts of resin were added 0.40 part of cobalt naphthenate and 0.35 part of lead naphthenate with thorough stirring, and 112 parts of 12.5 percent aqueous solution of diethanolamine was slowly added thereto. The stirring was continued to produce homogeneous aqueous composition, which contained about 40 percent water-soluble resin.

This aqueous composition was very stable and no precipitation was observed after 60 days storage at room temperature.

From the aqueous composition prepared by quite same manner as in example 1 (hereinafter referred to as "aqueous composition of example 1") bath composition for electrophoretic deposition was prepared by the following manner:

| | |
|---|---|
| Aqueous composition of Example 1 | 515 parts |
| Titanium dioxide | 280 parts |
| Carbon black | 10 parts |
| Water | 30 parts |

The above components were mixed in a pebble-mill for 20 hours to thoroughly disperse pigment. To the mixture were added 1,620 parts of aqueous composition of example 1 and 80 parts of water and mixed for another 2 hours, which was further diluted with water to produce a bath composition for electrophoretic deposition, in grey color, of 10 percent solid content. The electrodeposited coating obtained therefrom was curable at a room temperature or an elevated temperature to produce water-insoluble film of excellent properties.

EXAMPLE 2

A stable aqueous composition was prepared by the same manner as in example 1, except that 1,4-addition butadiene homopolymer of number average molecular weight of 1,000 was used in the place of 1,2-addition butadiene homopolymer. From said aqueous composition a bath composition, the deposited coating of which was curable at a room temperature or an elevated temperature, was prepared by the same manner as in example 1.

EXAMPLE 3

In the reactor same as that of example 1 were placed 100 parts of 1,2-addition butadiene homopolymer dicarboxylic acid having carboxyl group at the both ends of the polymer main chain and number average molecular weight of 1,500, prepared by living polymerization method, 30 parts of butoxyethanol and 0.2 part of tertiarybutylhydroxy toluene and heated with stirring to 100° C., nitrogen gas being blown in, and the system was maintained at said temperature, a mixture of 15 parts of acrylic acid, 15 parts of butoxyethanol and 0.3 part of benzoil peroxide being added dropwise in 2 hours. After the addition the system was further stirred at 100°C. for 1.5 hours and then cooled to room temperature. After cooled, to 138 parts of the resultant mixture containing 100 parts of resin were added to 0.40 part of cobalt naphthenate and 0.35 part of lead naphthenate, to which was further added slowly 112 parts of 12.5 percent aqueous solution of diethanolamine with stirring. Thus stable aqueous composition containing about 40 percent resin was obtained.

From the above aqueous composition a bath composition, the deposited coating of which was curable at a room temperature or an elevated temperature, was prepared by the same manner as in example 1.

EXAMPLE 4

In the reactor same as that of example 1 were placed 100 parts of 1,2-addition butadiene homopolymer of number average molecular weight of 4,000, prepared by living polymerization method, 100 parts of butoxyethanol and 1 part of tertiary butylhydroxytoluene, and the system was heated at 80° C., nitrogen gas being blown in, after which a mixture of 18 parts of methacrylic acid, 18 parts of butoxyethanol and 5 parts of tertiary butyl peroxide was added dropwise in 3 hours. During the operation the reaction temperature of 80° C. was maintained. After the above dropwise addition it was stirred at 80° C. for 2 hours to complete the reaction, and then cooled. After cooled, to 200 parts of the resultant product (containing 100 parts resin) 50 parts of a 35.8 percent aqueous solution of trimethylamine was slowly added with stirring, whereby an aqueous composition containing about 40 percent resin was obtained.

From the above composition a bath composition, the coating of which was curable at a room temperature or an elevated temperature, was prepared by the same manner as in example 1.

EXAMPLE 5

In the reactor same as that of example 1 were placed 100 parts of 1,2-addition butadiene homopolymer glycol having hydroxyl group at the both ends of the polymer main chain and number average molecular weight 1,500, prepared by living polymerization, and 30 parts of butoxyethanol and heated to 100° C., nitrogen gas being blown in, after which a mixture of 20 parts of acrylic acid, 20 parts of butoxyethanol and 0.5 parts of α,α'-azobisisobutyronitrile was dropwise added thereto in 2 hours. During the operation the system was maintained at 100° C. for 30 minutes after the dropwise addition a solution of 0.1 part of α,α'-azobisisobutyronitrile in 15 parts of butoxyethanol was further added dropwise in 15 minutes, the content being maintained at 100° C. to react for further 1 hour. After cooled, to 154 parts of the resultant product (resin content 100 parts) 96 parts of 11.5% aqueous solution of sodium hydroxide was slowly added with stirring, whereby an aqueous composition containing about 40% resin was obtained.

From the above composition a bath composition, the coating of which was curable at a room temperature or an elevated temperature was prepared by the same manner as in example 1.

Using the above bath compositions prepared by the examples 1 to 5, electrophoretic deposition was conducted under the following conditions, and electrodeposition characteristics of the compositions and properties of the film deposited therefrom were tabulated below.

The electrophoretic deposition was carried out by using an anode of steel plate, 5×10 cm., treated with zinc phosphate. The anode and cathode plates were disposed opposite at an interval of 10 cm. and dipped in a bath composition containing 10 percent solid and direct current at constant voltage was charged to the bath at 25°C. for 2 minutes, for electrodeposition. After breaking the current the anode plate with coating electrodeposited was taken out and after rinsing with water baked at 140° C. for 30 minutes.

Table 1

|  | Ex. 1 | Ex. 2 | Ex. 3 | Ex. 4 | Ex. 5 |
|---|---|---|---|---|---|
| Rate of amount deposited on inner surface of Anode (percent) | 24 | 23 | 29 | 22 | 28 |
| Rate of area of coating on inner of Anode (percent) | 82 | 82 | 87 | 80 | 87 |

2. Relation between thickness of the film and voltage

The thickness of films deposited on the plate by varying voltage was measured and the relation between the thickness and voltage was shown in table 2 below.

Table 2

Thickness of Film ($\mu$)

| Voltage | Ex. 1 | Ex. 2 | Ex. 3 | Ex. 4 | Ex. 5 |
|---|---|---|---|---|---|
| 40 | 12 | 12 | 10 | 13 | 11 |
| 60 | 23 | 23 | 17 | 22 | 17 |
| 80 | 30 | 30 | 22 | 33 | 23 |
| 100 | 38 | 38 | 28 | 40 | 28 |
| 120 | — | — | 32 | — | 34 |

3. Stability of Bath composition in long period Electrodeposition

By supplying paint daily to the bath so as to exchange the whole amount of paint in a week (turn over per week), the properties of electrodeposition and the appearance of coated film were sought at the initial stage and after 4 months and the results were shown in table 3 below.

TABLE 3

|  | Example 1 | | Example 3 | | Example 5 | |
|---|---|---|---|---|---|---|
|  | Initial stage | After 4 months | Initial stage | After 4 months | Initial stage | After 4 months |
| Specific conductivity ($\mu$℧ cm$^{-1}$) | 2.21×10² | 2.25×10² | 2.85×10² | 2.88×10² | 2.63×10² | 2.70×10² |
| Voltage | 80 | 80 | 100 | 100 | 100 | 100 |
| Initial current (amp.) | 1.58 | 1.65 | 1.88 | 1.96 | 1.70 | 1.82 |
| Film Thickness ($\mu$) | 29 | 31 | 28 | 29 | 28 | 27 |
| Coulombic yield (mg./coulomb.) | 17.0 | 16.8 | 14.0 | 13.6 | 16.0 | 15.7 |
| Appearance of cured film | Good | Good | Good | Good | Good | Good |

1. Throwing Power

Throwing power means the capacity of the paint to coat the areas of the anode which are difficult of access.

Two steel plates were used as anode at an interval of 2 mm., and the amounts of paint deposited and the areas of coated surfaces on the inner and outer surfaces of the anode plates were sought according to the method disclosed in "Deutsche Farben Zeitshrift" Sept., 1965, p. 361-370 and the rate of amount deposited on the inner surface and rate of area of the coating on the inner surface were determined by the following equations:

Rate of amount deposited on inner surface of Anode (percent)

$$= \frac{\text{Amount deposited on inner surface of anode}}{\text{Total amount deposited on inner and outer surfaces of anode}} \times 100$$

Rate of area of coating on inner surface of anode (%)

$$= \frac{\text{Area of coated film on inner surface of anode}}{\text{Area of coated film on outer surface of anode}} \times 100$$

4. Performance of Electrodeposited Film

The results of measurement of the films electrodeposited by using the bath composition of examples 1,3 and 4 were shown in table 4 below.

Table 4

|  | Ex. 1 | Ex. 3 | Ex. 4 |
|---|---|---|---|
| Film Thickness ($\mu$) | 25 | 27 | 25 |
| Pencil Hardness | H | H | 2H |
| Impact Resistance (DuPont Method 500g., ½") | front 50cm. OK back 50cm. OK | 50cm. OK 50cm. OK | 50cm. OK 50cm. OK |
| Erichsen Test | 8mm. OK | 8mm. OK | 8mm. OK |
| Adhesion Test (Cross Hatch) | Excell | Excell | Excell |
| Salt Spray Resistance (after 168 hrs. exposure) | under 3mm. | under 3mm. | under 3mm. |
| Immersion Test (in 5% NaOH aq. soln. 25° C. for 3 days) | no change | no change | no change |

As evident from the above electrodeposition characteristics and the performances of electrodeposited films measured as above:

1. Throwing power is excellent,
2. when successively electrodeposited for 4 months at a turn over per week, the electrodeposit characteristics at the initial stage and after 4 months substantially show almost no variation, and this also shows that the bath composition is stable for a long period and selectivity of electrodeposition is extremely low and negligible, and
3. the performances of the electrodeposited films also are exceptionally excellent.

What we claim is:

1. In a coating composition adapted for electrophoretic deposition containing an aqueous medium and a resinous binder dispersed therein, the improvement wherein the resinous binder is a modified butadiene polymer prepared by reacting a butadiene polymer of a number average molecular weight of 200 to 5,000 with a $\alpha$, $\beta$-ethylenically unsaturated monocarboxylic acid and neutralizing the resultant adduct with a base to turn it water-dispersible, said butadiene polymer being selected from the group consisting of homopolymers of butadiene, copolymers of at least 70 weight percent butadiene with at most 30 percent of an ethylenically unsaturated copolymerizable monomer, and derivatives of said homopolymers and said copolymers selected from the group consisting of polybutadiene dicarboxylic acid, polybutadiene glycol, partially oxidized polybutadiene, partially hydrogenated polybutadiene, and partially halogenated polybutadiene.

2. The coating composition of claim 1 wherein said homopolymers are selected from the group consisting of 1,2-addition butadiene homopolymer, 1,4-addition butadiene homopolymer, and 1,2- and 1,4-random addition butadiene homopolymer, and said copolymerizable monomer is selected from the group consisting of isoprene, chloroprene, styrene, methyl methacrylate, and acrylonitrile.

3. The coating composition of claim 2, in which said composition contains the modified butadiene polymer in a concentration of 30 to 60 weight percent.

4. The coating composition of claim 2, in which said composition has a pH value of 7.0 to 8.5.

5. The coating composition of claim 2, in which said butadiene polymer has a molecular weight of 800 to 4,000.

6. The coating composition of claim 5, in which said butadiene polymer is butadiene homopolymer.

7. In a bath composition adapted for electrophoretic deposition containing aqueous medium and a resinous binder and a pigment dispersed in the aqueous medium, the improvement wherein the resinous binder is a modified butadiene polymer prepared by reacting a butadiene polymer of a number average molecular weight of 200 to 5,000 with an $\alpha$, $\beta$-ethylenically unsaturated monocarboxylic acid and neutralizing the resultant adduct with a base to turn it water dispersible, said butadiene polymer being selected from the group consisting of homopolymers of butadiene, copolymers of at least 70 weight percent butadiene with at most 30 percent of an ethylenically unsaturated copolymerizable monomer, and derivatives of said homopolymers and said copolymers selected from the group consisting of polybutadiene dicarboxylic acid, polybutadiene glycol, partially oxidized polybutadiene, partially hydrogenated polybutadiene, and partially halogenated polybutadiene.

8. The bath composition of claim 6 wherein said homopolymers are selected from the group consisting of 1,2-addition butadiene homopolymer, 1,4-addition butadiene homopolymer, and 1,2- and 1,4-random addition butadiene homopolymer, and said copolymerizable monomer is selected from the group consisting of isoprene, chloroprene, styrene, methyl methacrylate, and acrylonitrile.

9. The bath composition of claim 10, in which the solid content of the composition is in the range of 5 to 30 weight percent.

10. The bath composition of claim 8, in which the pigment to binder ratio by weight is in the range of 1:1 to 1:5.